United States Patent [19]
Karlin

[11] Patent Number: 5,771,843
[45] Date of Patent: Jun. 30, 1998

[54] BREAK-AWAY TIE APPARATUS FOR SECURING ANIMALS

[75] Inventor: William C. Karlin, Peyton, Colo.

[73] Assignee: Safe-T-Tie Inc., Peyton, Colo.

[21] Appl. No.: 719,072

[22] Filed: Sep. 24, 1996

[51] Int. Cl.$^6$ ................................ A01K 3/00; B68B 5/00
[52] U.S. Cl. ................................. 119/772; 54/32; 24/602; 24/635
[58] Field of Search ................ 54/34, 64; 119/772, 119/774; 24/602, 629, 635; 278/21, 22

[56] References Cited

U.S. PATENT DOCUMENTS

| | | | |
|---|---|---|---|
| 3,171,183 | 3/1965 | Johnston | 24/635 |
| 4,049,293 | 9/1977 | Bouju | 24/602 X |
| 4,733,625 | 3/1988 | Allen | 24/602 X |

*Primary Examiner*—Robert P. Swiatek
*Attorney, Agent, or Firm*—Burns, Doane, Swecker & Mathis, L.L.P.

[57] ABSTRACT

An apparatus for tying a horse includes a base and a break-away tie element mounted releasably to the base. The base is mounted to a wall and includes a pair of gripping members that are spring-biased against opposite sides of a mounting portion of the tie rod. The spring tension applied to the mounting portion is selectively adjustable. When a horse whose rein is tied to a ring portion of the tie element rears up in a manner applying a sufficient force in a direction tending to pull the mounting portion from the base, the springs will yield, allowing this to occur. Thus, serious injury to the horse is prevented.

11 Claims, 2 Drawing Sheets

BREAK-AWAY TIE APPARATUS FOR SECURING ANIMALS

BACKGROUND OF THE INVENTION

The present invention relates to a tie apparatus for securing the rein of a tied-up animal, especially a horse.

When tying a horse, the rein is secured to an anchored object, such as a ring. However, a tied horse can present a danger to itself and others if the horse should become frightened and begin to rear-up. For example, if the horse rears up such that one of its legs travels higher than the anchored rein, that leg may pass across the top of the rein possibly causing the leg to become damaged or broken.

Also, the rein of a tied-up horse could become caught on a projecting object, severely limiting the freedom of movement of the horse's head. The horse may become frightened and tend to fight the rein, possibly causing the horse's head/neck area to become damaged or broken.

It would, therefore, be desirable to prevent a tied horse from harming itself (or others) in that fashion.

SUMMARY OF THE INVENTION

The present invention relates to a break-away animal tie apparatus comprising a base adapted to be anchored to a support, a tie element to which a animal's rein can be fastened, and a spring biased, reusable break-away connection connecting the tie element to the base.

Preferably, the base includes a body, and a pair of gripping members mounted on the body in space-to-part relationship to form a pocket in which a mounting portion of the tie element is disposed. At least one of the gripping members is spring biased toward the other gripping member for gripping the mounting portion of the tie element. The at least one gripping member is retractable against its spring biased in response to the tie member being urged out of the pocket under a predetermined force.

Preferably, the spring force is adjustable, and a visual indicator is provided for determining the amount of spring force which is applied.

BRIEF DESCRIPTION OF THE DRAWING

The objects and advantages of the invention will become apparent from the following detailed description of a preferred embodiment thereof in connection with the accompanying drawing in which like numerals designate like elements and in which.

DETAILED DESCRIPTION OF A PREFERRED EMBODIMENT OF THE INVENTION

Figure 1:
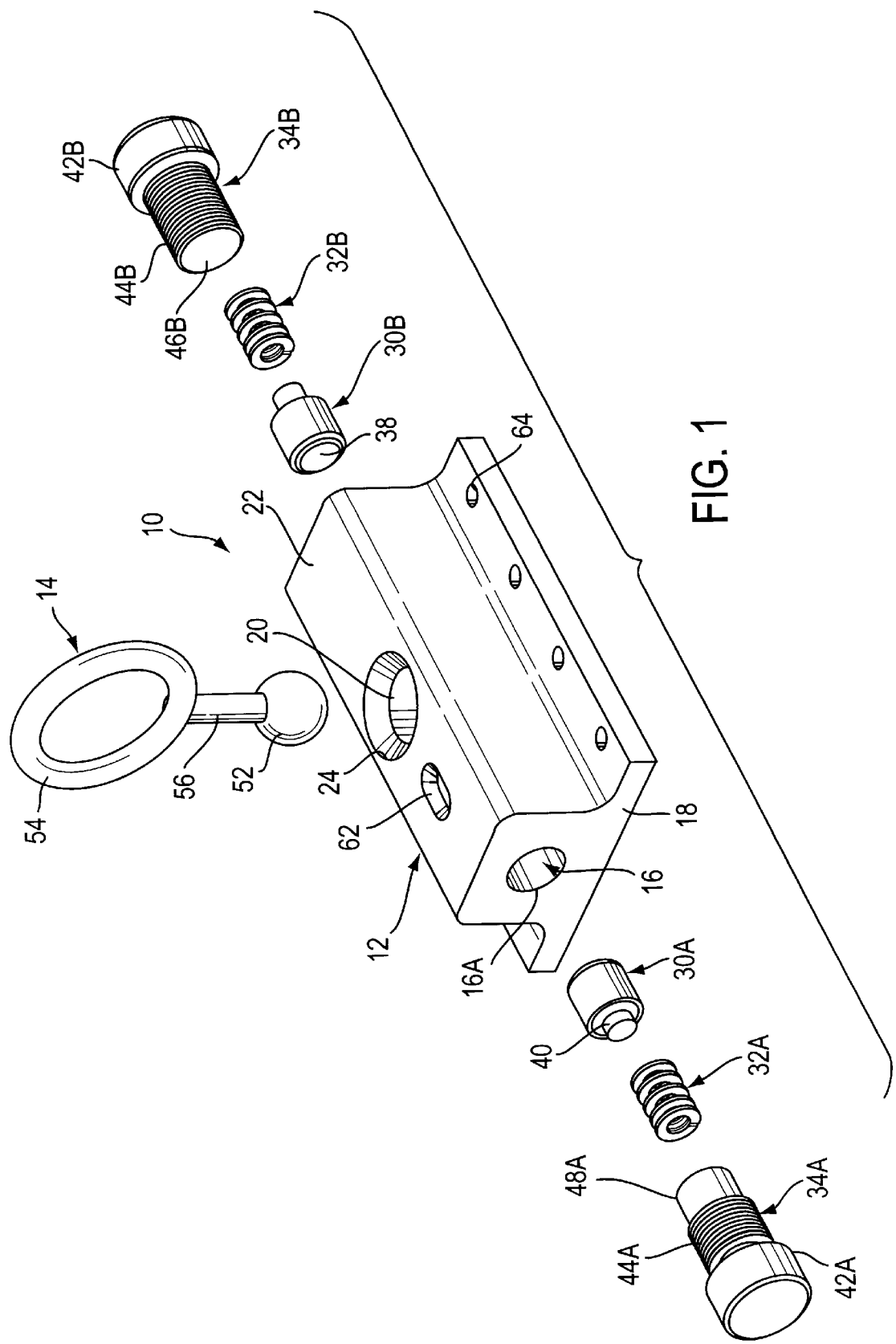
FIG. 1 is an exploded perspective view of a tie apparatus according to the present invention.
Figure 2:
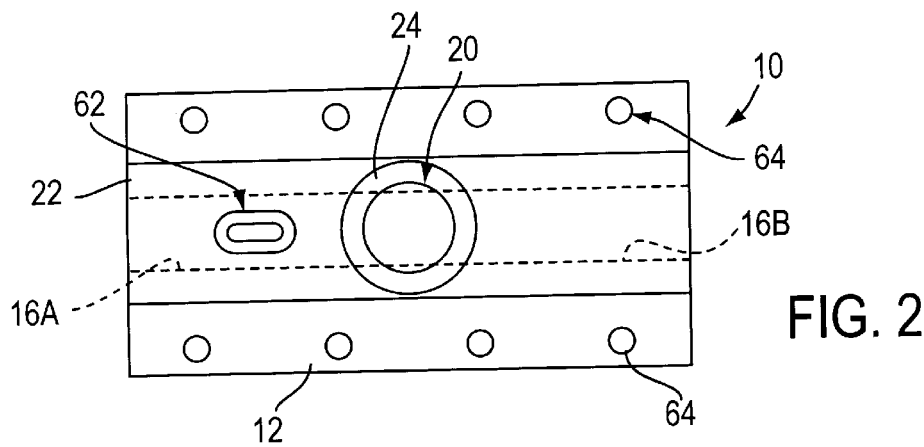
FIG. 2 is a front elevational view of a body portion of the apparatus depicted in FIG. 1.
Figure 4:
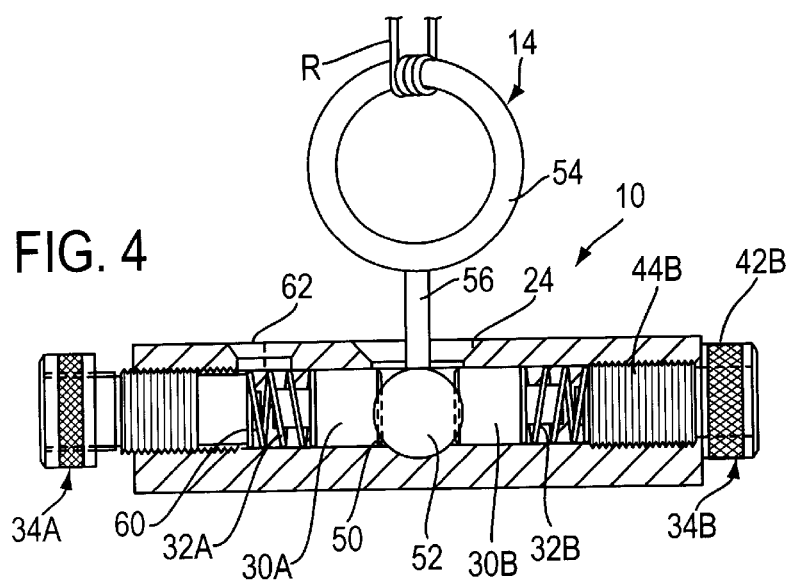
FIG. 4 is a horizontal sectional view taken through and assembled apparatus according to FIG. 1, with an animal's rein fastened to a tie element of the apparatus.

A break-away animal tie structure 10 includes a base 12 and a tie element 14 mounted in the base 12. The base 12 comprises a metallic body having a cylindrical bore 16 extending longitudinally therethrough from one end face 18 to the other of the body. A lateral bore 20 formed in a side face 22 of the body intersects the bore 16 and divides the bore into first and second bore sections 16A and 16B which have internal screw threads. The lateral bore 20 is beveled at its outer end 24.

Mounted in the first and second bore sections 16A, 16B are first and second gripping assemblies. Each gripping assembly comprises a gripping member 30A or 30B, a spring 32A or 32B, and a threaded bolt 34A or 34B.

Figure 3:
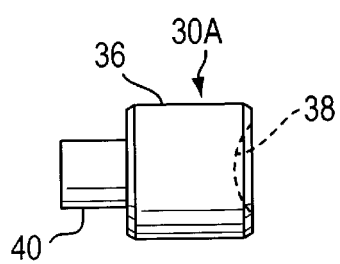
FIG. 3 is a side elevational view of a gripping member depicted in FIG. 1.

The gripping members 30A, 30B are of identical configuration. As shown in FIG. 3, the gripping member 30A includes a cylindrical head 36 on one end of which has a concave gripping face 38 in the shape of a segment of a sphere. The other end of the head 36 has a spring guiding stub 40.

The springs 32A, 32B are of identical coil configuration.

Each of the first and second threaded bolts 34A, 34B includes a knurled knob 42A or 42B, and an externally threaded shank 44A or 44B. A free end 46B of the shank 44B of the second threaded bolt 34B is flat and functions to bear against an outer end of the second spring 32B, i.e., to act as a stop for that spring.

The first bolt 34A is somewhat longer than the second bolt 34B in that it includes an unthreaded shank extension 48A, the inner end of which bears against an outer end of the first spring 32A.

Once the second bolt 34B has been fully screwed into the second bore section 16B, the first bolt is screwed into the first bore section 16A to a selected distance to compress the first spring 32A by a desired amount, thereby controlling the spring tension as will be subsequently explained.

When the gripping members 30A, 30B are disposed in their respective bore sections 16A, 16B, their concave gripping surfaces 38 face one another in spaced apart relationship along the axis of the longitudinal bore 16, to form a pocket 50 adapted to receive a mounting portion 52 of the tie element 14.

The mounting portion 52 is of generally ball or spherical shape, the curvature of which corresponds to the curvatures of the gripping surfaces 38 of the gripping members 30A, 30B. A circular ring portion 54 of the tie element 14 is connected to the mounting portion 52 by a stem portion 56.

To assemble the tie structure 10, the gripping assemblies 30A, 32A, 34A and 30B, 32B, 34B are inserted into their respective bore sections 16A, 16B, and the mounting portion 52 of the tie element 14 is positioned within the pocket 50 formed between the gripping faces 38 of the gripping members 30A, 30B.

The second threaded bolt 34B is then fully screwed into the second bore section 16B i.e., until its knob 42B abuts an end wall of the body of the base 12. The first threaded bolt 34A is then tightened by an amount sufficient to achieving a desired tensioning of the mounting portion 52. This can be achieved by viewing an inner edge 60 of the shank extension 48A of the first bolt 34A through a viewing slot 62 formed in the side 22 of the base body. The edge of the slot 62 can be provided with indicator marks adapted to be aligned with the edge 60 to indicate the weight of an animal for which the spring tension has been set.

Once the tie structure 10 has been assembled, the base is mounted on a wall, e.g., by means of screws extending through holes 64 of the base body. The rein of an animal, such as a horse, can then be tied to the ring portion 54. The tie element 14 can swing in all directions relative to the base 12, due to the spherically shaped peripheral surface of the mounting potion 52 and the correspondingly shaped spherical gripping surfaces 38.

Figure 5:
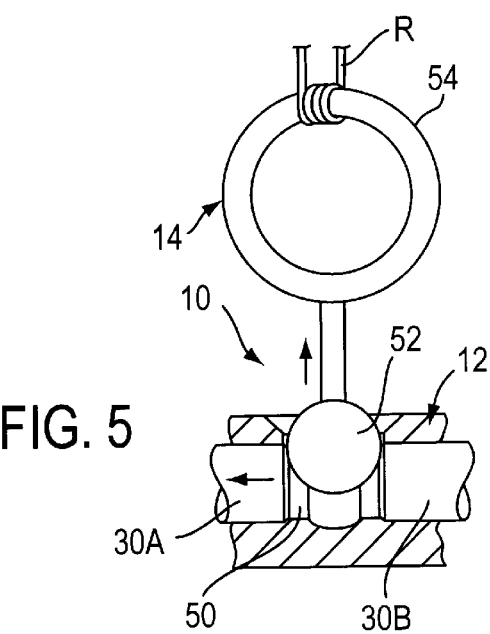
FIG. 5 is a fragmentary view of FIG. 4 depicting the tie element being pulled from the base.

In the event that the horse becomes frightened and rears up in a manner causing the horse's leg, head, neck, etc., to apply sufficient force to the rein, i.e., a force which could produce serious injury to the horse if not relieved, that force will be transmitted to the tie element in a manner tending to pull the mounting portion 52 out of the base as shown in FIG. 5. Accordingly, the mounting portion 52 applies a longitudinal force to the gripping member, causing the springs 32A, 32B to yield elastically, enabling the mounting portion 52 to exit the pocket 50. In that way, serious injury to the horse will be prevented.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A break-away animal tie apparatus comprising a base adapted to be anchored to a support, a tie element to which an animal's rein can be fastened, and a spring-biased, reusable break-away connection connecting the tie element to the base, wherein the base includes a body and a pair of gripping members mounted on the body in spaced apart relationship to form a pocket in which a mounting potion of the tie element is disposed, at least one of the gripping members being spring biased toward the other gripping member for gripping the mounting portion of the tie element, the at least one gripping member being retractable against its spring bias in response to the tie member being urged out of the pocket under a predetermined force.

2. The break-away animal tie apparatus according to claim 1, wherein each of the gripping members is spring biased toward the other gripping member.

3. The break-away animal tie apparatus according to claim 1, further including an adjuster for adjusting a spring force applied to the at least one gripping member.

4. The break-away animal tie apparatus according to claim 3, wherein the base includes an indicator for indicating adjustable settings to which the spring force can be adjusted.

5. The break-away animal tie apparatus according to claim 3, wherein the mounting portion of the tie element is swingable relative to the base.

6. The break-away animal tie apparatus according to claim 5, wherein the mounting portion is generally ball-shaped, and the gripping members include correspondingly shaped gripping surfaces.

7. The break-away animal tie apparatus according to claim 1, wherein the tie element is swingable relative to the base.

8. The break-away animal tie apparatus according to claim 1, including means for applying a manually adjustable spring bias to the break-away connection.

9. The break-away animal tie apparatus according to claim 8, further including an indicator on the base for indicating a magnitude of the spring force.

10. A break-away animal tie apparatus comprising a base adapted to be anchored to a support, a tie element to which an animal's rein can be fastened, and a spring-biased, reusable break-away connection connecting the tie element to the base, wherein the base includes a body having a longitudinal bore extending through the body from one end to another end thereof, a recess formed in a side of the body, and intersecting the longitudinal bore to divide the bore into first and second sections, first and second gripping members mounted slidably in the first and second bore sections, each gripping member including a curved gripping surface, the gripping surfaces of respective gripping members facing one another in spaced relationship along a longitudinal axis of the bore to define a pocket in which a mounting portion of the tie element is gripped, the mounting portion including a curved peripheral surface shaped correspondingly to the curved gripping surfaces, a pair of springs disposed in respective bore sections for biasing respective ones of the gripping members against the peripheral surface of the mounting portion, and a pair of screw-threaded bolts threadedly mounted in respective bore sections for compressing respective ones of the springs.

11. The break-away animal tie apparatus according to claim 10, wherein the body includes a viewing slot communicating with one of the bore sections for enabling a position of an inner end of the respective threaded bolt to be viewed for setting a predetermined spring-biasing force.

* * * * *